United States Patent
Sahar et al.

(10) Patent No.: US 10,921,167 B1
(45) Date of Patent: Feb. 16, 2021

(54) METHODS AND APPARATUS FOR VALIDATING EVENT SCENARIOS USING REFERENCE READINGS FROM SENSORS ASSOCIATED WITH PREDEFINED EVENT SCENARIOS

(71) Applicant: EMC IP Holding Company LLC, Hopkinton, MA (US)

(72) Inventors: Carmit Sahar, Tel-Aviv (IL); Marcelo Blatt, Modiin (IL); Alon Kaufman, Bnei-Dror (IL); Roni Frumkes, Tel-Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 251 days.

(21) Appl. No.: 14/865,472

(22) Filed: Sep. 25, 2015

(51) Int. Cl.
G01D 18/00 (2006.01)
G01W 1/18 (2006.01)

(52) U.S. Cl.
CPC .............. *G01D 18/00* (2013.01); *G01W 1/18* (2013.01)

(58) Field of Classification Search
CPC ................................ G01D 18/00; G01W 1/18
See application file for complete search history.

(56) References Cited

U.S. PATENT DOCUMENTS

| | | | | |
|---|---|---|---|---|
| 2007/0150565 | A1* | 6/2007 | Ayyagari | H04L 67/12 709/223 |
| 2009/0022362 | A1* | 1/2009 | Gagvani | G06T 7/254 382/100 |
| 2011/0240798 | A1* | 10/2011 | Gershzohn | G08B 17/00 244/129.2 |
| 2015/0254950 | A1* | 9/2015 | Patterson | G08B 13/00 340/541 |

OTHER PUBLICATIONS

Siegel et al. Confidence Fusion, Proc. of Workshop on Robotic Sensing (2004).
Hossain et al. Learning Multi-Sensor Confidence using Difference of Opinions, IEEE Int'l Instrumentation and Measurement Technology Conference (2008).

* cited by examiner

*Primary Examiner* — Shaun M Campbell
(74) *Attorney, Agent, or Firm* — Ryan, Mason & Lewis, LLP

(57) ABSTRACT

Methods and apparatus are provided for validating event scenarios using reference readings obtained from a plurality of sensors associated with one or more predefined event scenarios. If a reading from a first sensor satisfies a reference reading of the first sensor for at least one identified scenario in a scenario library, at least one additional sensor is identified from the identified scenario and a reading is obtained from the additional sensors. The identified scenario is validated when the readings of the additional sensors satisfy the reference reading for the additional sensors from the identified scenario. A confidence level is optionally determined based on the readings of the sensors in the identified scenario. The readings of the sensors are optionally monitored over time to update the confidence level of the identified scenario.

20 Claims, 5 Drawing Sheets

METHODS AND APPARATUS FOR VALIDATING EVENT SCENARIOS USING REFERENCE READINGS FROM SENSORS ASSOCIATED WITH PREDEFINED EVENT SCENARIOS

FIELD

The field relates generally to event detection, and more particularly, to detection of predefined event scenarios using sensors.

BACKGROUND

Scenario detection systems are often used to detect event scenarios that are usually of a catastrophic nature, such as fires and floods. These types of event scenarios are typically multidimensional and are reflected through various domains. For example, a typical scenario of interest in a power plant might be determined by monitoring smoke detectors, thermometers, motion sensors, electrical current stability, vibration and video images.

Early detection of catastrophic events is important as such events often result in loss of life, property damage and/or monetary expenditures. The detection of potential event scenarios at an early stage allows them to be prevented or mitigated before they escalate to a hazardous situation. However, the monitored detectors or sensors may be noisy or otherwise unreliable, and an unusual reading in a single detector is not always indicative of a real event.

A need therefore exists for methods and apparatus for validating event scenarios using reference readings obtained from a plurality of sensors associated with one or more predefined event scenarios.

SUMMARY

One or more illustrative embodiments of the present invention provide methods and apparatus for validating event scenarios using reference readings obtained from a plurality of sensors associated with one or more predefined event scenarios. The reference readings are optionally automatically modified at the end of each event. In accordance with one embodiment of the invention, a first method is provided comprising the steps of obtaining a reading from a first sensor of a plurality of distributed sensors; obtaining a scenario library comprised of a plurality of event scenarios, wherein a given event scenario comprises at least one reference reading for each of a plurality of the distributed sensors involved in the given event scenario; evaluating the reading of the first sensor to determine if the reading from the first sensor satisfies a reference reading of the first sensor for at least one of the scenarios; and performing the following steps if a scenario is identified where the reading from the first sensor satisfies the reference reading of the first sensor for the identified scenario: identifying at least one additional sensor from the identified scenario; obtaining at least one reading of the at least one additional sensor; determining if the at least one reading of the at least one additional sensor satisfies a reference reading for the at least one additional sensor from the identified scenario; and validating the identified scenario when the at least one reading of the at least one additional sensor satisfies the reference reading for the at least one additional sensor from the identified scenario.

In one or more exemplary embodiments, a confidence level is determined based on the readings of the sensors in the identified scenario. The readings of the sensors are optionally monitored over time to update the confidence level of the identified scenario.

The methods and devices of the illustrative embodiments overcome one or more of the problems associated with conventional techniques, and provide for validation of a predefined event scenario using reference readings obtained from a plurality of sensors associated with the predefined event scenarios. These and other features and advantages of the present invention will become more readily apparent from the accompanying drawings and the following detailed description.

DETAILED DESCRIPTION

Illustrative embodiments of the present invention will be described herein with reference to exemplary sensors, event detectors, and other processing devices, as well as the event readings and complex scenarios processed thereby. It is to be appreciated, however, that the invention is not restricted to use with the particular illustrative system and device configurations shown. Accordingly, the terms "sensor" as used herein is intended to be broadly construed, so as to encompass, for example, sensors designed specifically for a specific purpose, such as thermometers and smoke detectors, as well as general-purpose devices, such as smartphones and tablets that perform a sensing function.

In addition, the term "event detectors" as used herein is intended to be broadly construed so as to encompass, for example, any type of processing device that incorporates event detection functionality. Furthermore, the term "complex scenario" as used herein is intended to be broadly construed so as to encompass, for example, any type of event that can be detected using a plurality of sensors.

As will be described, the present invention in one or more illustrative embodiments provides methods and apparatus for validating event scenarios using reference readings obtained from a plurality of sensors associated with one or more predefined event scenarios.

In one or more exemplary embodiments, at least one reading is obtained from a given sensor. A scenario library is employed that contains one or more reference readings for a plurality of sensors involved in each predefined scenario. The scenario library is scanned to determine if the obtained reading corresponds to a reference reading for the given sensor for at least one scenario in the scenario library. If a potential scenario is identified, then readings are obtained from at least one additional sensor associated with the potential scenario. If the obtained readings from the at least one additional sensor correspond to the specified reference reading(s) of the potential scenario, and the temporal evolution of the sensor readings corresponds to the temporal evolution in the library, the potential scenario is validated with increasing levels of confidence.

Figure 1:
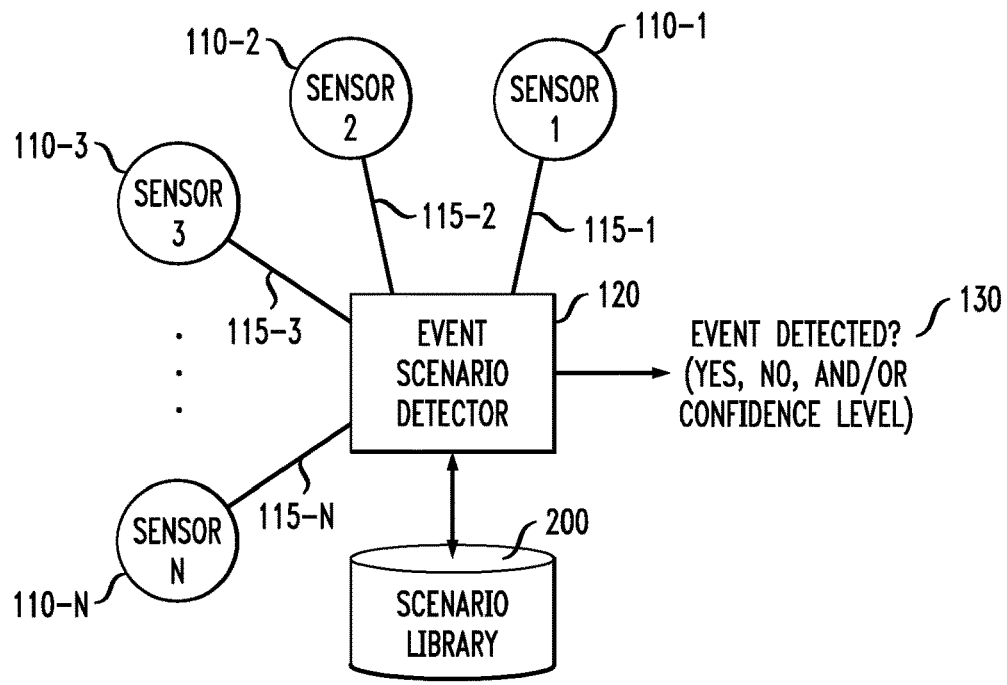
FIG. 1 illustrates an exemplary event scenario detector in accordance with one or more embodiments of the present invention.

FIG. 1 illustrates an exemplary event scenario detector 120 in accordance with one or more embodiments of the present invention. As shown in FIG. 1, a plurality of sensors 110-1 through 110-N provide corresponding sensor readings 115-1 through 115-N to the event scenario detector 120. The event scenario detector 120 compares sensor readings 115 from sensors 110 to a plurality of predefined scenarios in a scenario library 200, discussed further below in conjunction with FIG. 2, to make a determination 130 indicating whether a predefined event has been detected, optionally with a confidence level. The event scenario detector 120 optionally queries and re-queries over time one or more of the sensors 110 for sensor readings 115.

As noted above, the sensors 110 can be, for example, sensors designed for a specific purpose, such as thermometers and smoke detectors, as well as general-purpose sensor devices, such as, for example, smartphones and tablets that perform a sensing function.

The event scenario detector 120 may be implemented as any kind of computing device, such as, for example, a personal computer, a workstation, a server, an enterprise server, a laptop computer, a mobile computer, a smart phone or a tablet computer.

Figure 2:
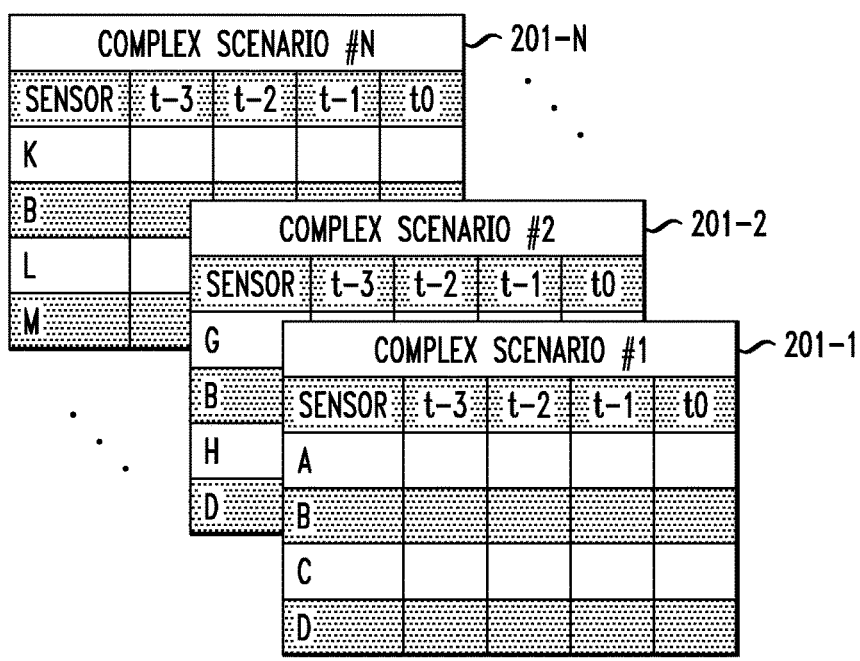
FIG. 2 illustrates an exemplary scenario library.

FIG. 2 illustrates an exemplary scenario library 200. The exemplary scenario library 200 is comprised of a plurality of predefined event scenarios 201-1 through 201-N. As shown in FIG. 2, a given predefined scenario 201 comprises at least one reference reading for each of a plurality of the distributed sensors 110 involved in the given predefined scenario 201. In the exemplary implementation of FIG. 2, a plurality of predefined sensor readings 115 are specified over time (e.g., at time units t-3 through t0) for each sensor 110 in a given predefined scenario 201. In this manner, actual sensor readings 115 from each sensor 110 within a particular event scenario 201 can be compared to reference readings specified in the exemplary scenario library 200. In addition, the reference readings specified in the scenario library 200 for a particular scenario 201 are optionally updated based upon user feedback and/or outcomes and validations of actual scenarios.

The reference readings indicated in the scenario library 200 may be, for example, expected sensor reading values for the scenario, a range of values to satisfy the scenario, a minimum or maximum value to satisfy the scenario, a degree of change in sensor reading values to satisfy the scenario or a temporal change in any of these values according to the scenario evolution.

Figure 3:
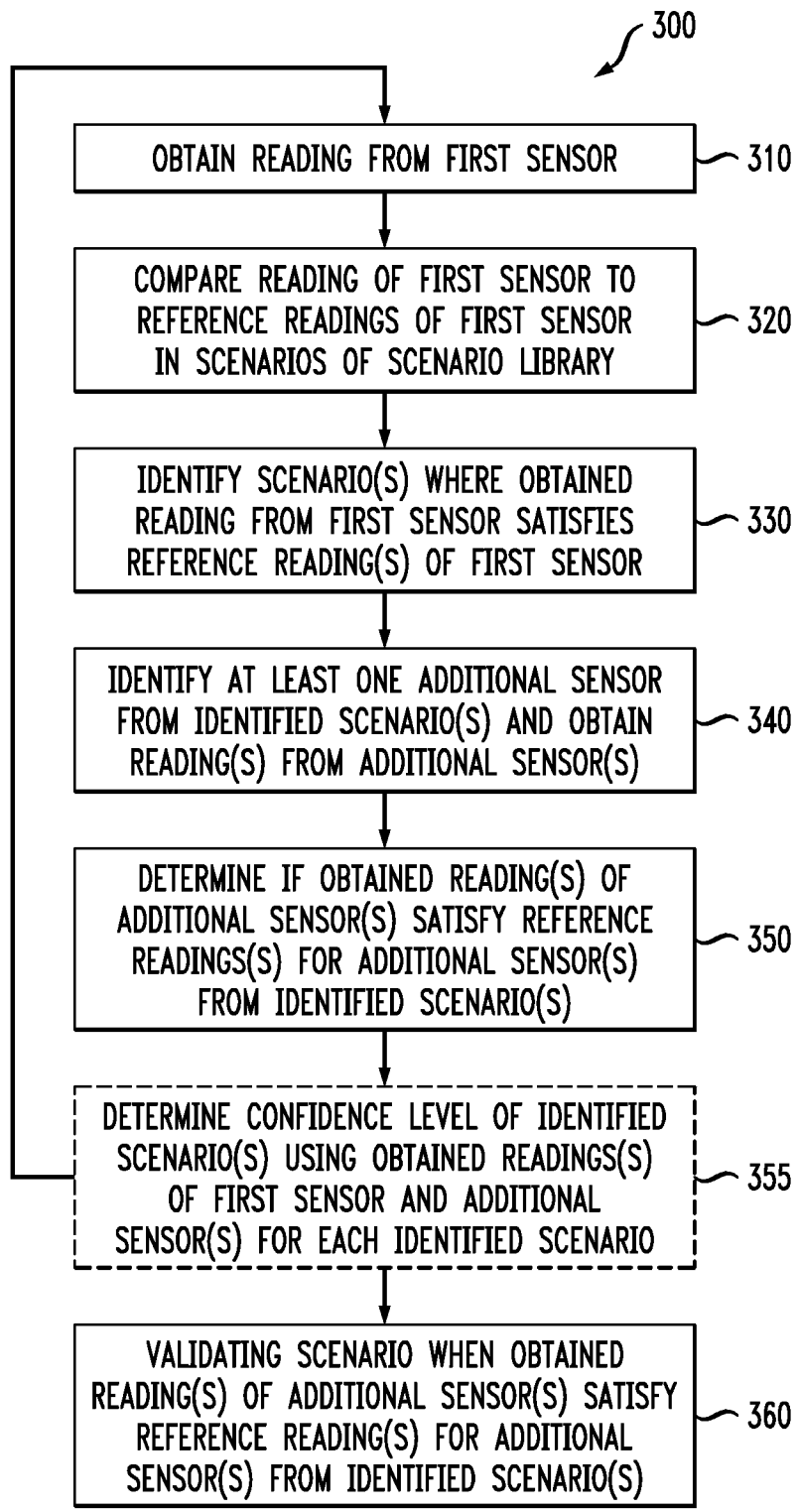
FIGS. 3 and 4 are flow charts illustrating an exemplary implementation of an event scenario detection process according to one embodiment of the invention.

FIG. 3 is a flow chart illustrating an exemplary implementation of an event scenario detection process 300 according to one embodiment of the invention. As shown in FIG. 3, the exemplary event scenario detection process 300 initially obtains a reading from a first sensor 110 during step 310.

The reading of the first sensor 110 is compared to predefined reference readings of the first sensor in the predefined scenarios of the scenario library 200 during step 320. The exemplary event scenario detection process 300 then identifies any scenarios 201 in the scenario library 200 during step 330 where the obtained reading(s) from the first sensor 110 satisfy the predefined reference readings of the first sensor 110 specified for the scenario.

During step 340, the exemplary event scenario detection process 300 identifies at least one additional sensor 110 from any identified scenarios and obtains one or more readings from the additional sensors. The exemplary event scenario detection process 300 then determines if the obtained readings of the additional sensors satisfy the predefined reference readings for the additional sensors 110 from the identified scenarios during step 350. A confidence level of the identified scenarios is determined during step 355 using the obtained readings of first sensor and additional sensors for each identified scenario, as discussed further below in conjunction with FIG. 5. Program control optionally returns to step 310 to obtain additional readings of the first sensor and/or the additional sensors and to update the confidence level for each identified scenario based on changing readings of the first sensor 110 and additional sensors 110.

The scenario is validated during step 360 when the obtained readings of the additional sensors 110 satisfy the predefined reference readings for the additional sensors as specified in the identified scenarios.

In one or more exemplary embodiments, the event scenario detection process 300 assumes that the scenarios identified in step 330 are real based upon the reading from the first sensor satisfying the reference reading of the first sensor for the identified scenario. The event scenario detection process 300 optionally predicts readings of the additional sensor(s) from the identified scenario based upon one or more reference readings for the additional sensor(s) from the identified scenario and verifies whether the obtained reading(s) of the additional sensor(s) satisfy the predicted readings.

The sensor readings 115 obtained during step 340 from a given sensor 110 comprise one or more of a value read by the given sensor 110, a change in value read from the given sensor 110, a verification of a predicted value, an indication of whether an actual reading of the given sensor 110 exceeds a predefined reading threshold and an indication of whether a change in reading values satisfy the identified scenario.

The event scenario detection process 300 is optionally triggered by the reading obtained from the first sensor in step 310 satisfying a predefined criteria, such as satisfying any reference reading specified for the first sensor in the scenario library.

Figure 4:
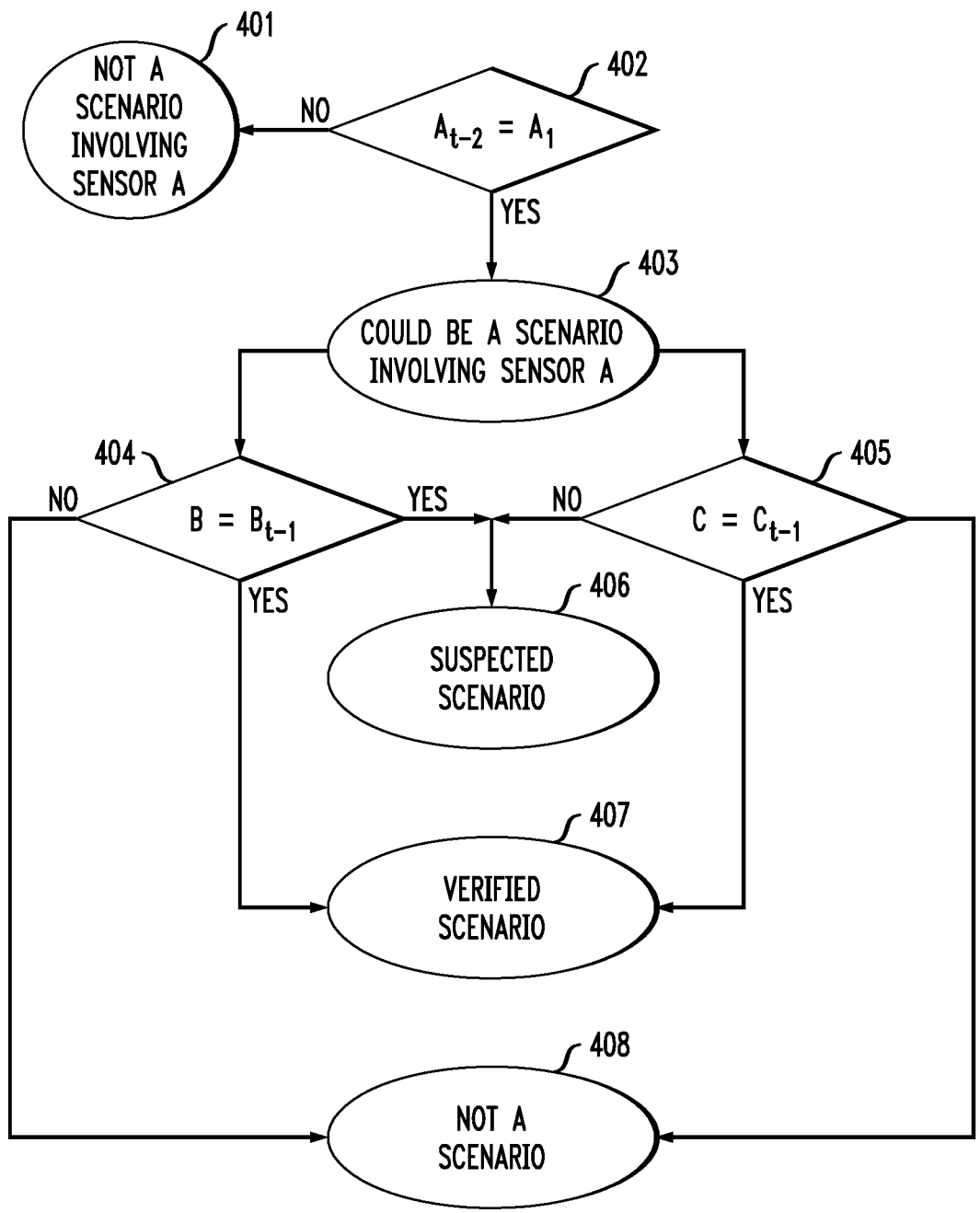

FIG. 4 is a flow chart illustrating an exemplary implementation of an event scenario detection process 400 according to one embodiment of the invention. As shown in FIG. 4, when a reading has been obtained from sensor A, a test is performed during step 402 to determine if the reading of sensor A satisfies a reference reading of sensor A in the scenario library 200. If it is determined during step 402 that the reading of sensor A does not satisfy a reference reading of sensor A in the scenario library 200, then it is determined during step 401 that the reading is not a scenario involving sensor A. If, however, it is determined during step 402 that the reading of sensor A satisfies a reference reading of sensor A in the scenario library 200 for at least one predefined scenario, then it is determined during step 403 that there could be a scenario involving sensor A.

The exemplary event scenario detection process 400 identifies at least one additional sensor 110 from any identified scenarios and obtains one or more readings from the additional sensors. In the example of FIG. 4, additional sensors B and C are identified for the scenario. Next, tests are performed during steps 404 and 405 to determine if a sensor reading from additional sensor B satisfies a reference reading in the identified scenario for sensor B and if a sensor reading from additional sensor C satisfies a reference reading in the identified scenario for sensor C, respectively. If it is determined during steps 404 and 405 that the obtained readings of additional sensors B and C do not satisfy the specified reference readings in the identified scenario for additional sensors B and C, then it is determined during step 408 that there is no scenario.

If, however, it is determined during step 404 that readings of sensor B satisfy the reference readings for sensor B from the identified scenario and that readings of sensor C do not satisfy the reference readings for sensor C from the identified scenario, then it is determined during step 406 that the scenario is suspected.

If it is determined during steps 404 and 405 that the obtained readings of additional sensors B and C do satisfy the specified reference readings in the identified scenario for additional sensors B and C, then it is determined during step 407 that the identified scenario is verified or validated.

In one or more exemplary embodiments, a fusion of all binary feedbacks is calculated using a probabilistic model, and the certainty level of the assumed scenario is declared.

Furthermore in FIG. 4, the threshold for the trigger for the initial reading in step 402 can optionally be quite low, because it would not set off an actual alarm. Rather, the exemplary event scenario detection process 400 queries other sensors, and the time evolution of the readings of all relevant sensors would be monitored, using knowledge gathered previously about their behavior, and inserted into the scenario library 200. Thus, the signal in the sensor A that triggers the exemplary event scenario detection process 400 may be quite low, and this is acceptable since it does not produce an alarm until the scenario is validated during step 407. This allows for early detection of scenarios.

Figure 5:
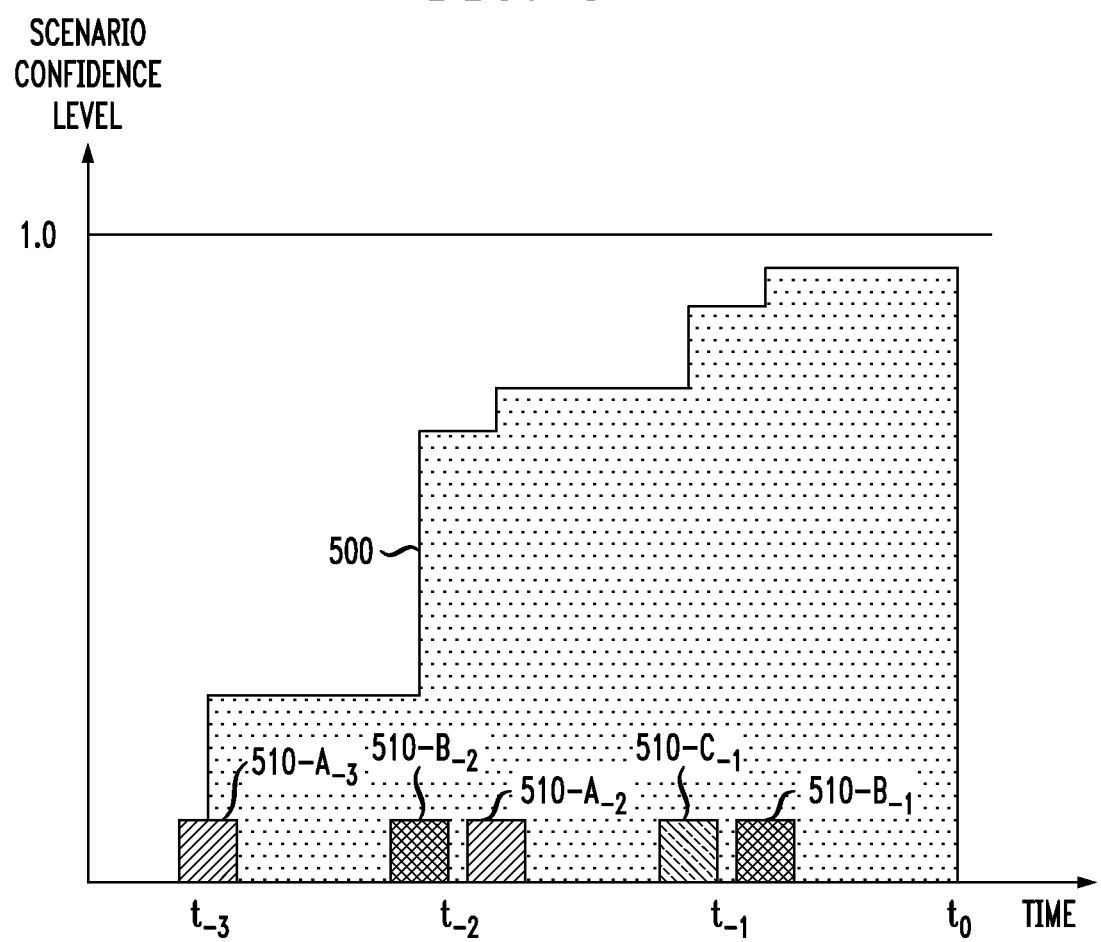
FIG. 5 illustrates a normalized confidence level indicating a likelihood that a particular exemplary scenario is occurring as a function of time.

FIG. 5 illustrates a normalized confidence level 500 indicating a likelihood that a particular exemplary scenario is occurring as a function of time, as readings 510-A, 510-B, 510-C are obtained from corresponding sensors A, B and C specified in a particular scenario. As shown in FIG. 5, an anomalous reading 510-$A_{-3}$ is initially obtained from sensor A that triggers the monitoring at time t-3. The confidence level 500 is set to approximately 0.2 based on the initial reading 510-$A_{-3}$ from sensor A.

The exemplary event scenario detection process 300, 400 identifies at least one additional sensor 110 from any identified scenarios and obtains one or more readings from the additional sensors, as discussed above in conjunction with FIGS. 3 and 4.

At time t-2, a reading 510-$B_{-2}$ is obtained from related sensor B, together with an updated reading 510-$A_{-2}$ from sensor A. In one or more exemplary embodiments, the event scenario detector 120 integrates the Boolean response from sensor B (e.g., whether the reading from sensor B satisfies the predicted reference reading value) to the processing, in order to support or refute the conclusion arrived at from sensor A, thereby removing a false alarm or, in the example of FIG. 5, increasing the scenario confidence level 500 to approximately 0.6.

At time t-1, a Boolean response 510-$C_{-1}$ arrives from sensor C and another Boolean response 510-$B_{-1}$ arrives from sensor B which were actively queried by the event scenario detector 120 to confirm or reject the scenario conjecture. At time t0, the confidence level for the conjecture of a specific scenario is updated, using a real-time algorithm which integrates the confidence level of individual events (e.g., sensor responses to Boolean questions) weighed by the reliability of the separate data sources.

In one or more exemplary embodiments, the event scenario detector 120 learns sensor behavior by modeling the time evolution of all measuring devices, including normal trends in time; safe boundaries where a seemingly unusual reading is in fact normal; and behavior of the sensor before, during and after the scenarios which we wish to detect.

In addition, the event scenario detector 120 records system behavior in emergencies into the scenario library 200, thus refining the recognition of known emergencies and learning new ones.

For a more detailed discussion of exemplary techniques for computing confidence levels, see, for example, Mel Siegel and Huadong Wu, "Confidence Fusion," Proc. of Workshop on Robotic Sensing (2004); and/or M. Anwar Hossain et al., "Learning Multi-Sensor Confidence using Difference of Opinions," IEEE Intl Instrumentation and Measurement Technology Conference (2008), each incorporated by reference herein.

Among other benefits, aspects of the present invention allow early identification of scenarios using information from available sensors, for example, by comparing current measurements to previous known scenarios. In one or more embodiments, a potential scenario is validating by "snapping" sensors (i.e., querying potentially transient sensors which may usually not provide constant readings, such as smartphones).

Figure 6:
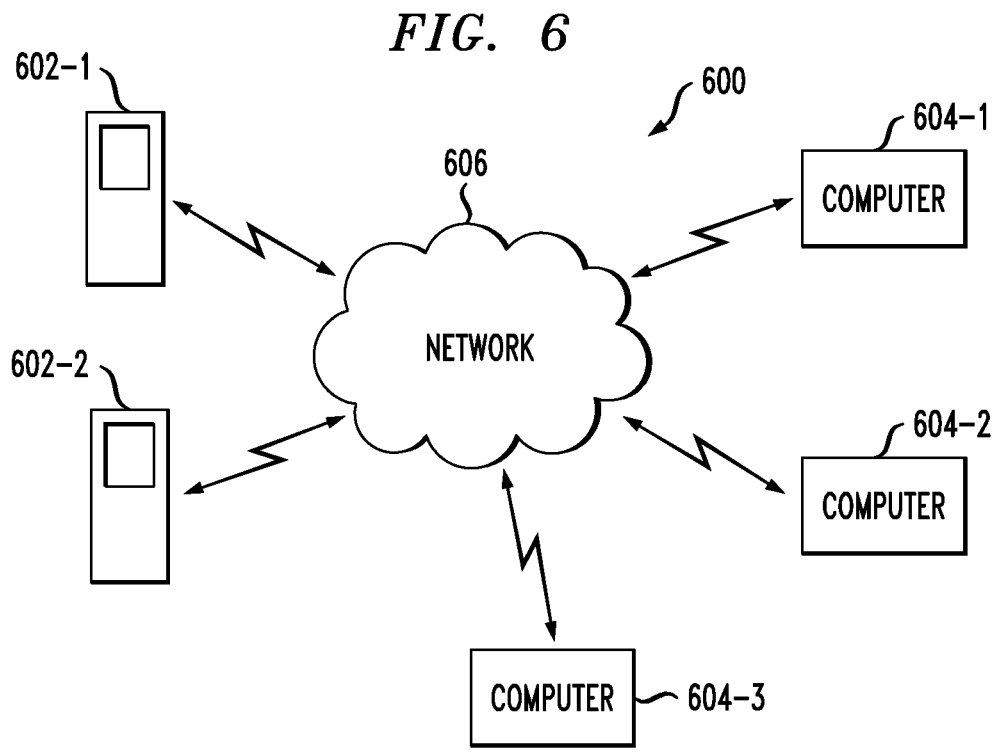
FIG. 6 is a diagram illustrating an example embodiment of communication systems that may incorporate functionality according to one or more embodiments of the invention.

FIG. 6 is a diagram illustrating an example embodiment of communication systems that may incorporate functionality according to one or more embodiments of the invention. As described herein, event scenario detection techniques of the type associated with one or more embodiments of the invention may be implemented in a wide variety of different applications. By way merely of illustration, one exemplary communication system application that may incorporate such techniques will now be described with reference to FIG. 6.

As depicted in FIG. 6, a communication system 600 comprises a plurality of mobile devices 602-1 and 602-2 and computers 604-1, 604-2 and 604-3, configured to communicate with one another over a network 606. Any two or more of the devices 602 and 604 may correspond to a sensors 110 and event scenario detectors 120, respectively, configured to implement at least one embodiment of the invention, as described herein. It is also to be appreciated, however, that the techniques disclosed herein can be implemented in numerous other applications. For example, while FIG. 6 depicts network 606 as a wireless network, it is to be appreciated that one or more embodiments of the invention can be implemented in connection with a wired network.

Further, aspects of the present invention are described herein with reference to flowchart illustrations, communication diagrams and/or block diagrams of methods, apparatus, systems and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a special purpose computer or other specialized programmable data processing apparatus to produce a machine, such that the instructions, which execute via the processor of the computer or other specialized programmable data processing apparatus, implement the functions/acts specified in the flowchart and/or block diagram block or blocks.

As further described herein, such computer program instructions may also be stored in a computer readable medium that can direct a computer, other programmable devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause sensors 110 and event scenario detectors 120 to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart, communication diagrams and block diagrams in the figures illustrate the architecture, functionality, and operation of possible implementations of systems, methods and computer program products according to various embodiments of the present invention. In this regard, each block in the flowchart, communication diagrams or block diagrams may represent a component, segment, or portion of code, which comprises at least one executable instruction for implementing the specified logical function(s). It should be noted that the functions noted in the block may occur out of the order noted in the figures.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may be referred to herein as a "system."

Figure 7:
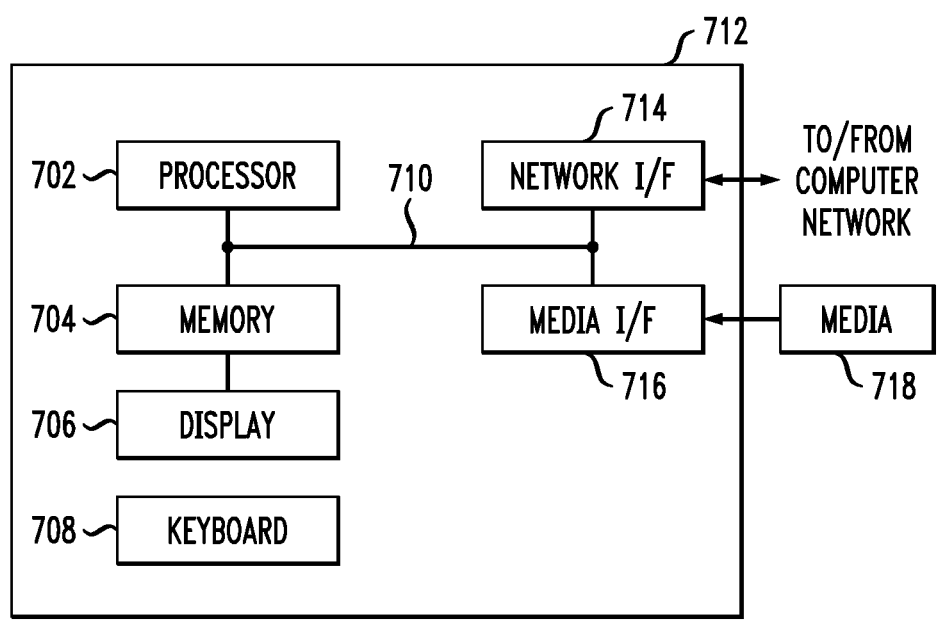
FIG. 7 is a system diagram of an exemplary device on which at least one embodiment of the invention can be implemented.

FIG. 7 is a system diagram of an exemplary event scenario detector 120 on which at least one embodiment of the invention can be implemented. As depicted in FIG. 7, an example implementation employs, for example, a processor 702, a memory 704, and an input/output interface formed, for example, by a display 706 and a keyboard 708. The term "processor" as used herein can include one of multiple processing device(s), such as, for example, one that includes a central processing unit (CPU), a microprocessor, a microcontroller, an application-specific integrated circuit (ASIC), a field-programmable gate array (FPGA), and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a graphical user interface) and a mechanism for providing results associated with the processing unit (for example, a display).

The processor 702, memory 704, and input/output interface such as display 706 and keyboard 708 can be interconnected, for example, via bus 710 as part of a data processing unit 712. Suitable interconnections via bus 710, can also be provided to a network interface 714 (such as a network card), which can be provided to interface with a computer network, and to a media interface 716 (such as a diskette or compact disc read-only memory (CD-ROM) drive), which can be provided to interface with media 718.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 708, displays 706, and pointing devices, can be coupled to the system either directly (such as via bus 710) or through intervening I/O controllers.

Network adapters such as network interface 714 (for example, a modem, a cable modem, an Ethernet card, etc.) can also be coupled to the system to enable the data processing system to become coupled to other data processing systems or remote printers or storage devices through intervening private or public networks.

As used herein, a "server" includes a physical data processing system (such as system 712 as depicted in FIG. 7) running a server program. It will be understood that such a physical server may or may not include a display and keyboard.

As noted, at least one embodiment of the invention can take the form of a computer program product embodied in a computer readable medium having computer readable program code embodied thereon. As will be appreciated, multiple combinations of computer readable media may be utilized. The computer readable medium can include a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, steps, operations, elements, and/or components, but do not preclude the presence or addition of another feature, step, operation, element, component, and/or group thereof.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from event scenario detection. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
    obtaining a non-binary reading from a first sensor of a plurality of distributed sensors, wherein the distributed sensors monitor a particular physical area and comprise at least one of: one or more smoke detectors, one or more thermometers, one or more motion sensors, and one or more cameras;
    obtaining a scenario library comprised of a plurality of event scenarios, wherein each event scenario comprises at least one reference reading for each of a plurality of said distributed sensors involved in the given event scenario, wherein at least one of said at least one reference reading for a given event scenario comprises a non-binary reference reading;
    evaluating said non-binary reading of said first sensor to determine if said non-binary reading from said first sensor satisfies a non-binary reference reading of the first sensor for at least one of said scenarios; and
    performing, using at least one processing device, the following steps in response to identifying a scenario where said non-binary reading from said first sensor satisfies said non-binary reference reading of said first sensor for said identified scenario, wherein said identified scenario comprises an emergency scenario related to said particular physical area:
    identifying at least one additional sensor from said identified scenario;
    obtaining at least one reading of said at least one additional sensor identified from said identified scenario;
    determining if said at least one reading of said at least one additional sensor satisfies a reference reading in said scenario library for said at least one additional sensor from said identified scenario;
    validating said identified scenario when said at least one reading of said at least one additional sensor identified from said identified scenario satisfies said reference reading for said at least one additional sensor from said identified scenario;
    updating said reference readings in said scenario library for said identified scenario based upon one or more of said readings of said sensors in said identified scenario; and
    triggering an alarm for said identified scenario to mitigate said identified scenario only after said validating of said identified scenario.

2. The method of claim 1, further comprising the step of updating said scenario library based upon user feedback.

3. The method of claim 1, further comprising the step of determining a confidence level based on said readings of said sensors in said identified scenario.

4. The method of claim 3, further comprising the steps of monitoring the readings of said sensors over time and updating the confidence level of said identified scenario based on said readings of said sensors over time.

5. The method of claim 1, further comprising the step of assuming the identified scenario to be real based upon the non-binary reading from the first sensor satisfying the non-binary reference reading of the first sensor for said identified scenario.

6. The method of claim 5, further comprising the step of predicting one or more readings of said at least one additional sensor from said identified scenario based upon one or more reference readings for the at least one additional sensor from said identified scenario and verifying whether said obtained at least one reading of said at least one additional sensor satisfy the predicted readings.

7. The method of claim 1, wherein at least one of said readings is obtained from a given one of said sensors by querying said given sensor.

8. The method of claim 1, wherein at least one of said obtained readings from a given sensor comprises one or more of a value read by said given sensor, a change in value read from said given sensor, a verification of a predicted value, an indication of whether an actual reading of said given sensor exceeds a predefined reading threshold and an indication of whether a change in readings satisfies said identified scenario.

9. The method of claim 1, wherein said method is triggered by said non-binary reading from said first sensor satisfying a predefined criteria.

10. An event detection system, comprising:
a memory; and
at least one processing device, coupled to the memory, operative to:
obtaining a non-binary reading from a first sensor of a plurality of distributed sensors, wherein the distributed sensors monitor a particular physical area and comprise at least one of: one or more smoke detectors, one or more thermometers, one or more motion sensors, and one or more cameras;
obtaining a scenario library comprised of a plurality of event scenarios, wherein each event scenario comprises at least one reference reading for each of a plurality of said distributed sensors involved in the given event scenario, wherein at least one of said at least one reference reading for a given event scenario comprises a non-binary reference reading;
evaluating said non-binary reading of said first sensor to determine if said non-binary reading from said first sensor satisfies a non-binary reference reading of the first sensor for at least one of said scenarios; and
performing, using at least one processing device, the following steps in response to identifying a scenario where said non-binary reading from said first sensor satisfies said non-binary reference reading of said first sensor for said identified scenario, wherein said identified scenario comprises an emergency scenario related to said particular physical area:
identifying at least one additional sensor from said identified scenario;
obtaining at least one reading of said at least one additional sensor identified from said identified scenario;
determining if said at least one reading of said at least one additional sensor satisfies a reference reading in said scenario library for said at least one additional sensor from said identified scenario;
validating said identified scenario when said at least one reading of said at least one additional sensor identified from said identified scenario satisfies said reference reading for said at least one additional sensor from said identified scenario;
updating said reference readings in said scenario library for said identified scenario based upon one or more of said readings of said sensors in said identified scenario; and
triggering an alarm for said identified scenario to mitigate said identified scenario only after said validating of said identified scenario.

11. The event detection system of claim 10, wherein said at least one processing device is further configured to determine a confidence level based on said readings of said sensors in said identified scenario.

12. The event detection system of claim 11, wherein said at least one processing device is further configured to monitor the readings of said sensors over time and update the confidence level of said identified scenario based on said readings of said sensors over time.

13. The event detection system of claim 10, wherein at least one of said readings is obtained from a given one of said sensors by querying said given sensor.

14. An article of manufacture comprising a non-transitory machine readable recordable medium containing one or more programs which when executed by at least one processing device implement the steps of:
obtaining a non-binary reading from a first sensor of a plurality of distributed sensors, wherein the distributed sensors monitor a particular physical area and comprise at least one of: one or more smoke detectors, one or more thermometers, one or more motion sensors, and one or more cameras;
obtaining a scenario library comprised of a plurality of event scenarios, wherein each event scenario comprises at least one reference reading for each of a plurality of said distributed sensors involved in the given event scenario, wherein at least one of said at least one reference reading for a given event scenario comprises a non-binary reference reading;
evaluating said non-binary reading of said first sensor to determine if said non-binary reading from said first sensor satisfies a non-binary reference reading of the first sensor for at least one of said scenarios; and
performing, using at least one processing device, the following steps in response to identifying a scenario where said non-binary reading from said first sensor satisfies said non-binary reference reading of said first sensor for said identified scenario, wherein said identified scenario comprises an emergency scenario related to said particular physical area:
identifying at least one additional sensor from said identified scenario;
obtaining at least one reading of said at least one additional sensor identified from said identified scenario;
determining if said at least one reading of said at least one additional sensor satisfies a reference reading in said scenario library for said at least one additional sensor from said identified scenario;
validating said identified scenario when said at least one reading of said at least one additional sensor identified from said identified scenario satisfies said reference reading for said at least one additional sensor from said identified scenario;
updating said reference readings in said scenario library for said identified scenario based upon one or more of said readings of said sensors in said identified scenario; and
triggering an alarm for said identified scenario to mitigate said identified scenario only after said validating of said identified scenario.

15. The article of manufacture of claim 14, further comprising the step of determining a confidence level based on said readings of said sensors in said identified scenario.

16. The article of manufacture of claim 15, further comprising the steps of monitoring the readings of said sensors over time and updating the confidence level of said identified scenario based on said readings of said sensors over time.

17. The article of manufacture of claim 14, wherein at least one of said readings is obtained from a given one of said sensors by querying said given sensor.

18. The method of claim 1, wherein the distributed sensors are located within the particular physical area.

19. The method of claim 18, wherein said particular physical area comprises a building, and wherein the emergency scenario comprises a fire in said building.

20. The event detection system of claim 10, wherein the distributed sensors are located within the particular physical area.

* * * * *